US012785935B2

(12) United States Patent
Hite

(10) Patent No.: US 12,785,935 B2

(45) Date of Patent: Nov. 3, 2026

(54) RANDOM NUMBER GENERATION BASED ON GEODETIC DATUM

(71) Applicant: Bradford Thomas Hite, Valencia, CA (US)

(72) Inventor: Bradford Thomas Hite, Valencia, CA (US)

( * ) Notice: Subject to any disclaimer, the term of this patent is extended or adjusted under 35 U.S.C. 154(b) by 28 days.

(21) Appl. No.: 19/060,315

(22) Filed: Feb. 21, 2025

(65) Prior Publication Data

US 2026/0254613 A1 Aug. 27, 2026

(51) Int. Cl.
*H04L 9/06* (2006.01)

(52) U.S. Cl.
CPC .................................. *H04L 9/0656* (2013.01)

(58) Field of Classification Search
CPC ..................................................... H04L 9/0656
See application file for complete search history.

(56) References Cited

U.S. PATENT DOCUMENTS 11,588,632 B2 * 2/2023 Shimada ............... G06F 21/602
2014/0257957 A1 * 9/2014 Archuleta .......... G06Q 30/0225 705/14.27
2015/0351068 A1 * 12/2015 Deleeuw ................ H04L 67/52 455/456.1
2019/0250888 A1 * 8/2019 Packes .................... G06F 7/586
2020/0053558 A1 * 2/2020 Hallock ................... G06N 3/09
2024/0005296 A1 * 1/2024 Stankoulov ........ G06Q 20/3224

* cited by examiner

*Primary Examiner* — Simon P Kanaan

(57) ABSTRACT

A unique system for the implementation of random number sequences generated based on user geodetic datum (pos/time). Geodetic information, being temporary in nature, can be propagated in position, time or both to provide dynamically updating PRNG seeding for any participant. The guaranteed uniqueness of the geodetic datum assures a single-time worldwide unique seed generation capability thereby allowing a PRNG to create a random number sequence with similar properties. This is based on the fact two user stations cannot occupy the same physical space at the same time. The invention is compatible with current implementations of mobile communications and equipment given the global acceptance/usage of embedded GNSS capabilities. Application examples using the invention's method of random number generation are provided for: encrypting a continuous data stream, automotive mobile ranging sensor and packet base encryption across a public network.

9 Claims, 5 Drawing Sheets

System Block Diagram

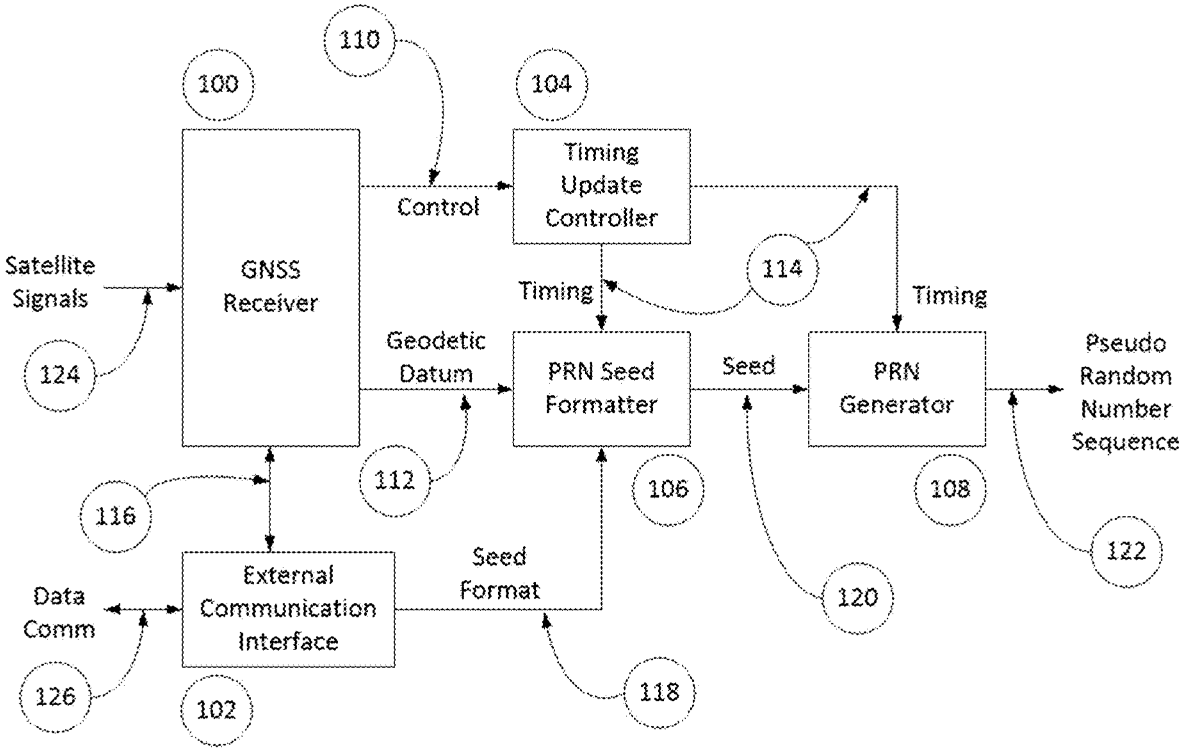
FIG. 1 – System Block Diagram

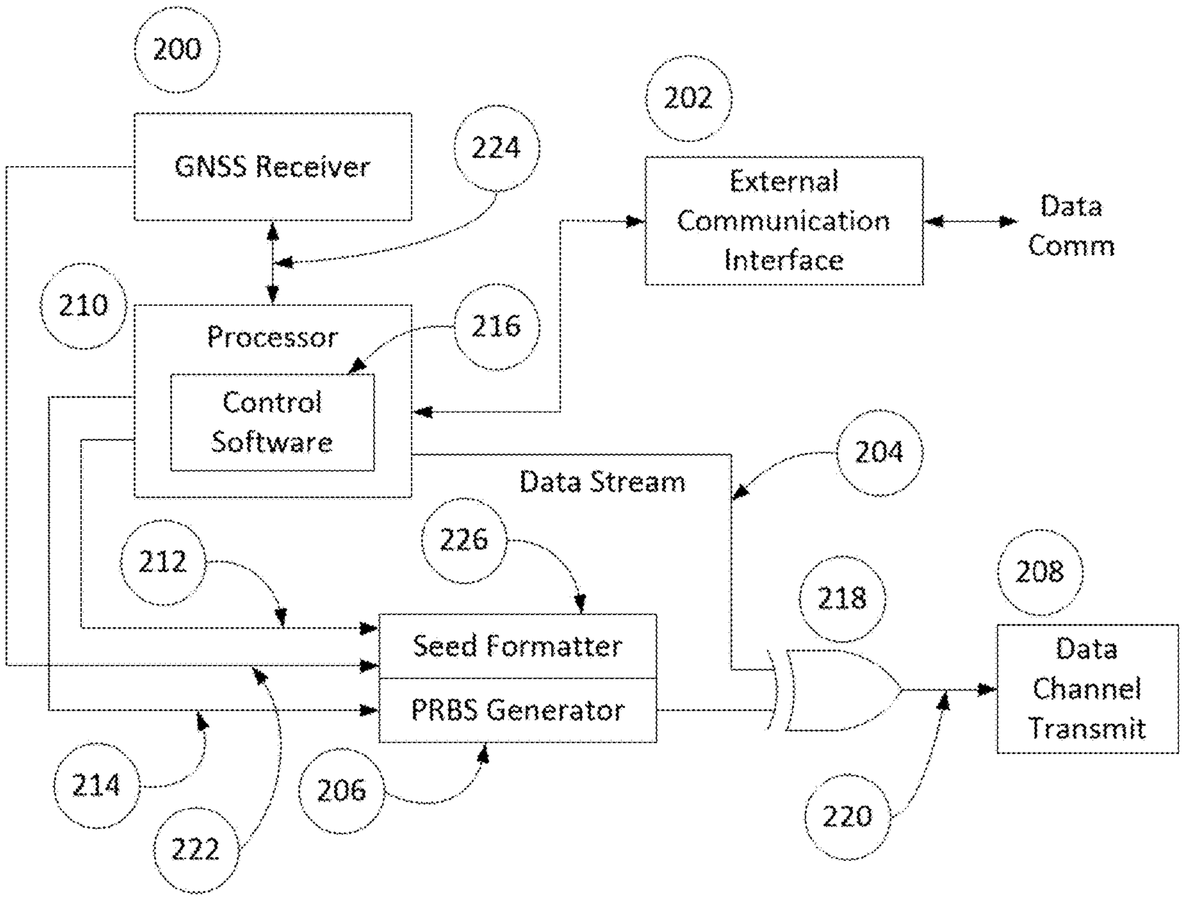
FIG. 2 – Data Channel Encoder Block Diagram

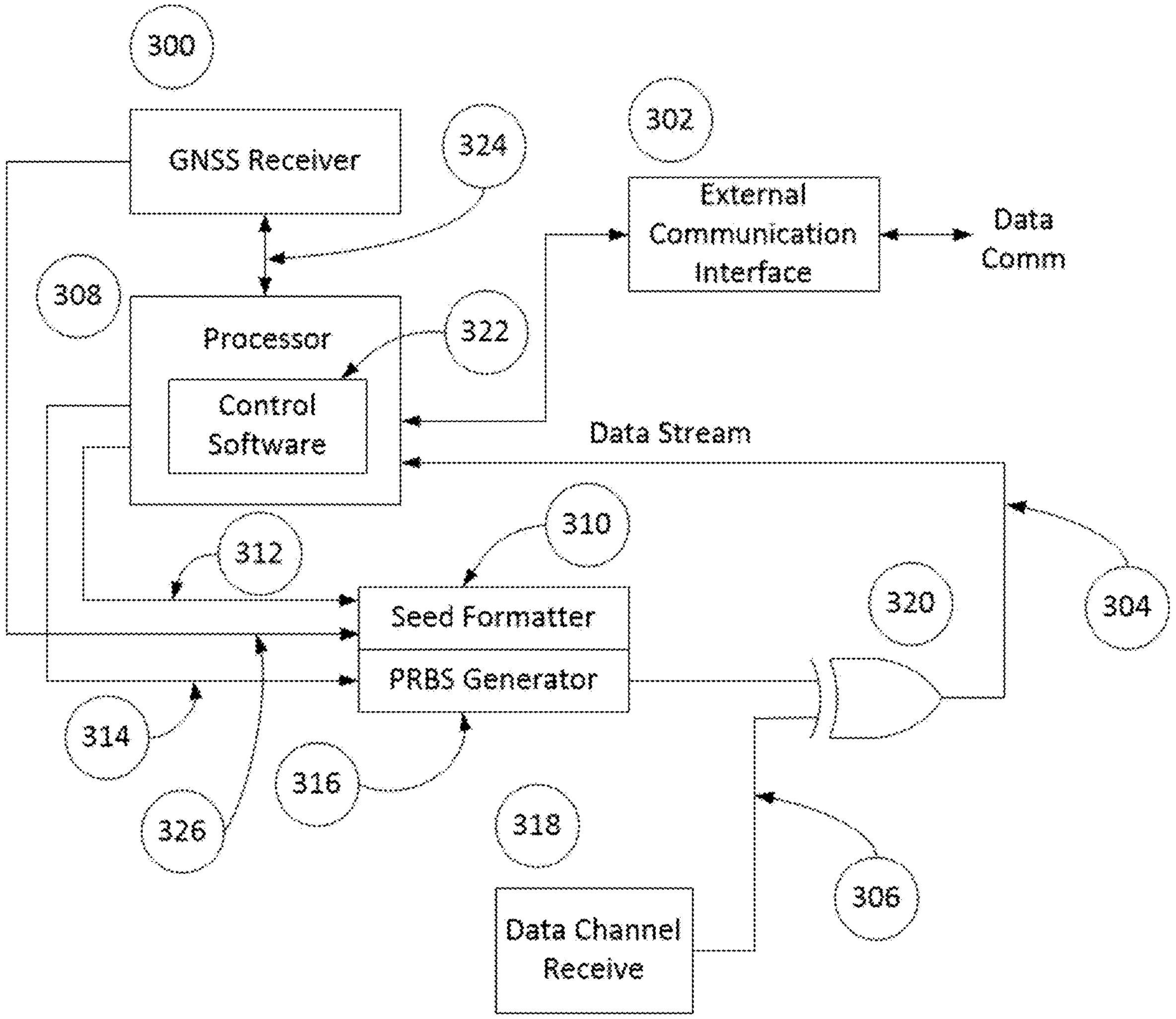
FIG. 3 – Data Channel Decoder Block Diagram

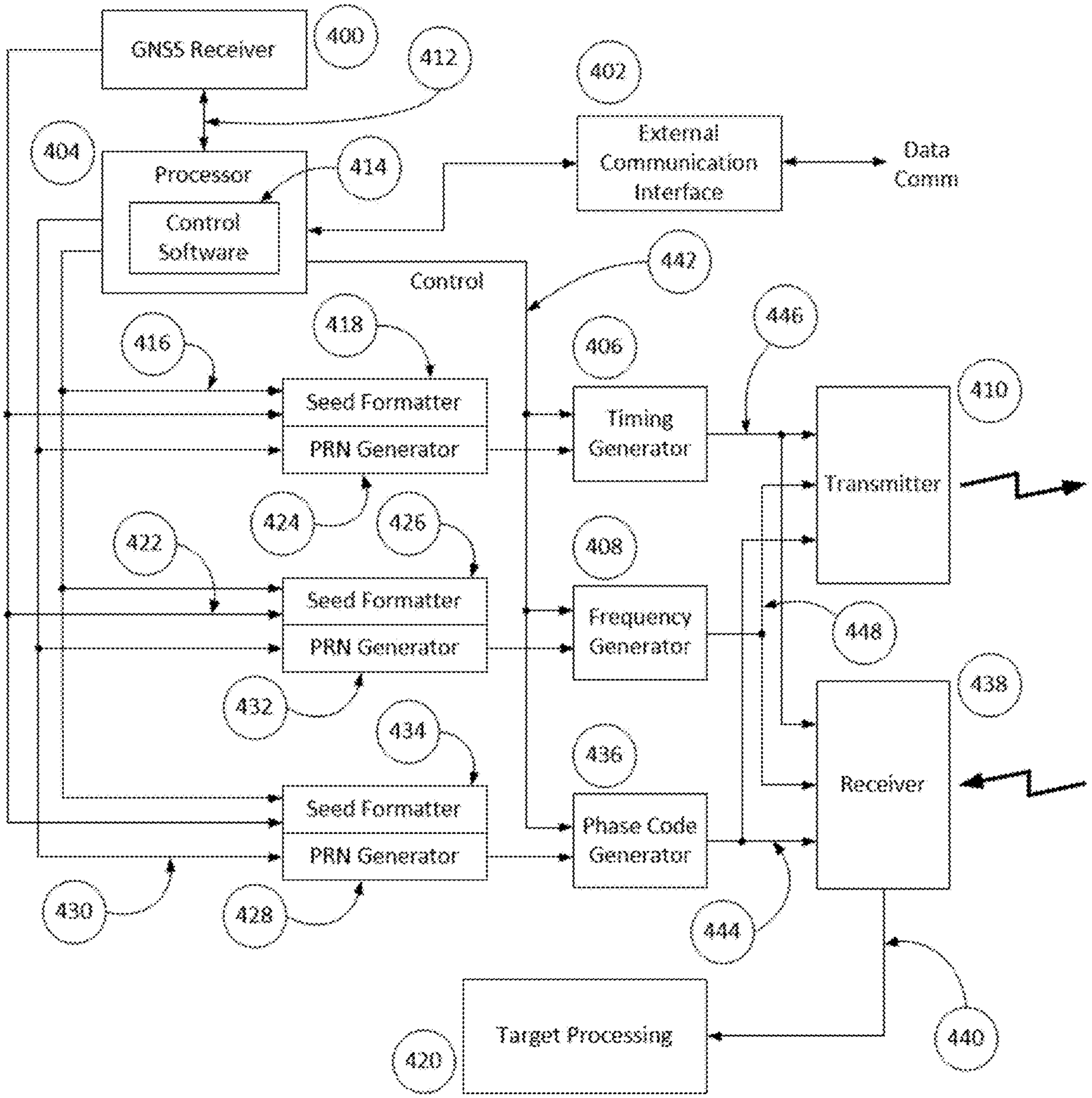
FIG. 4 – Automotive Radar Block Diagram

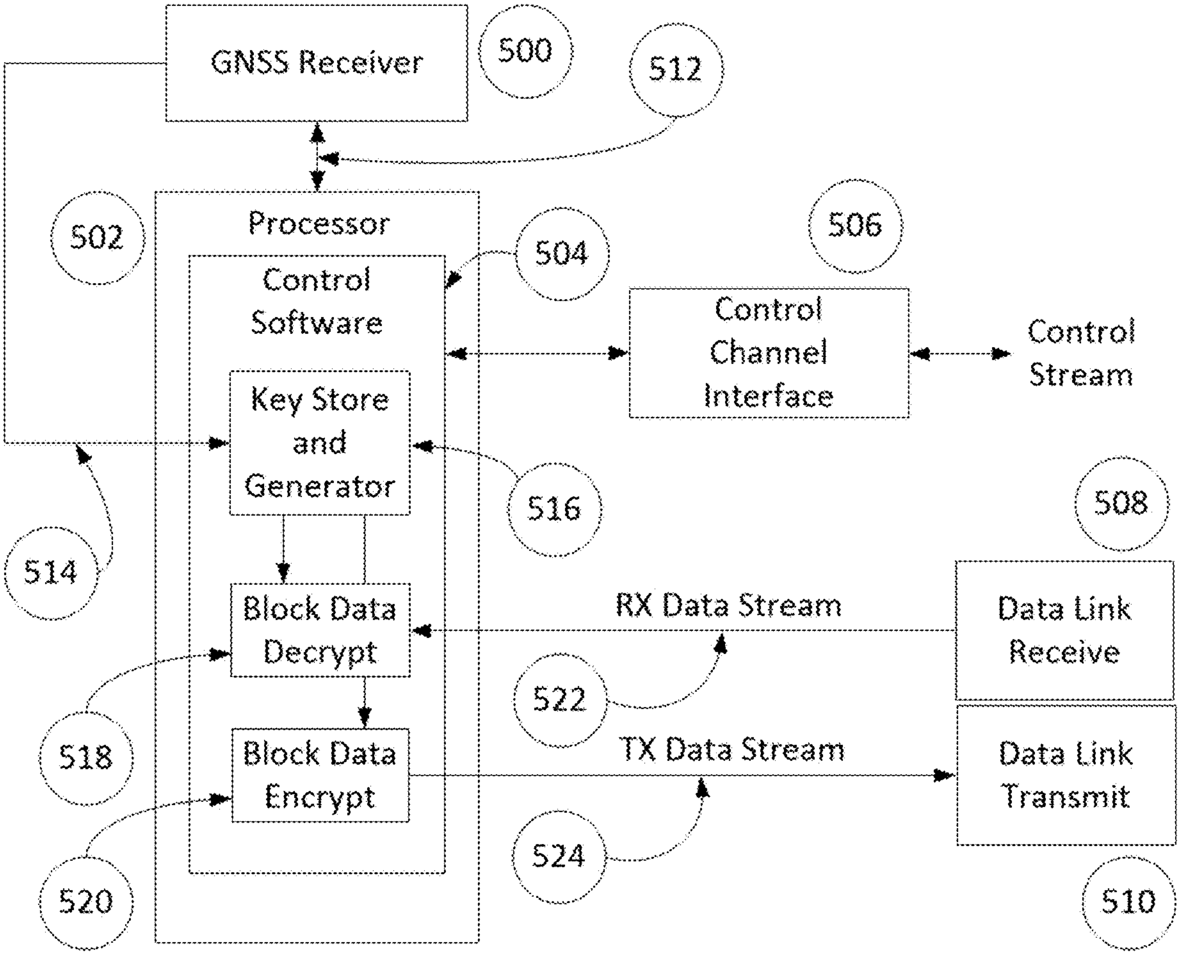
FIG. 5 – Synchronous Encryption Block Diagram

RANDOM NUMBER GENERATION BASED ON GEODETIC DATUM

BACKGROUND OF THE INVENTION

1. Field of the Invention

This invention relates to the field of creating unique random number sequences by a pseudo random number generator (PRNG). Specifically, the random number generator seeding values are uniquely derived from the user station geodetic datum parameters. Based on real time global navigation satellite system (GNSS) data, each user station will have a unique set of geodetic datum parameters representing a precise global location at an instant in time. These parameters are used to derive a random number sequence having the properties of uniqueness, temporary persistence and one-time usage. The invention is compatible with current implementations of mobile communications and equipment given the global acceptance/usage of embedded GNSS capabilities.

2. Description of the Related Art

Providing one-time unique random numbers typically requires utilization of a true random number generator (TRNG) based on noise statistics. True random number generators circuits are configured to operate on inherent electrical circuit noise to create a random sequence. Common circuit configurations utilize analog amplification of either thermal or electrical circuit noise which is then converted into digital values. An alternative to the true random number generator is the completely digital pseudo random number (PRN) generator. Pseudo random number generator circuits commonly are built as linear feedback polynomial feedback registers capable of producing a random sequence. This configuration of random number generator (RNG) requires an initial value or seed to be provided to the circuit as the starting point for a random sequence. Using different seed values will cause the circuit to produce a different random sequence however the calculation method of the initial seed can be a limitation. Software based random number generator functions commonly utilize the host computer system time as a unique seed value. However, the case exists where multiple fixed or mobile stations are using the same time value as the seed value. This would produce an equivalent random sequence for all stations, leading to interference or communication blockages. The present invention provides a solution to this problem by utilizing each station's geodetic datum information based on 3D location plus time in deriving seed values. Each station has a unique position/time combination, therefore each station is guaranteed to produce a unique random sequence based on the geodetic datum-based seed value. Another possible aspect of the present invention is mitigation against future high performance computer attacks against cryptograph systems. Given the nature of a continuously updating-one time unique PRNG seed, it would be nearly impossible to track and decrypt the generated cyphertext. Current GNSS receivers can produce a fix rate at or exceeding ten per second thereby allowing iterative re-seeding of the PRNG. Additionally, the user station geodetic datum data is constantly changing.

Random sequences derived from ever changing geodetic information have deterministic properties of 1) uniqueness, 2) usable for a temporary period and 3) one time generation. Geodetic datum information can also be propagated in position, time or both to provide a dynamically updating PRNG seed for any participant. This periodically changing or updating of each user station's PRNG seed information based on the latest geodetic datum is especially useful in mobile environments. A linear feedback random number generator topology can produce a theoretically infinite number of random sequences limited by its "period" which is determined by the size of its internal state (seed), eventually repeating the same sequence of numbers once it reaches the end of its cycle. The number of unique random sequences is equal to the possible combinations of the seed value. As an example, if the PRNG seed is sized as 32-bits, if can potentially generate 2^32 or 4.3 billion different random sequences before repeating. A simple example of using the present invention to produce PRNG seed values can be based on a GNSS receiver reporting geodetic datum information using industry standard NEMA 183 messages. In these messages, strings representing latitude (DDMM.MMMM), longitude (DDDMMM.MMMM) and time (HHMMSS.SS) are transferred on ASCII format. These three strings containing a total of roughly 26 characters being used as inputs to a hashing algorithm such as MD5 to produce the final PRNG seed value. While MD5 results in a fixed 128-bit output value, many hashing algorithms are available to produce shorter 32-bit or 64-bit outputs. An important design aspect in selection of a hashing algorithm is collision avoidance performance whereby different inputs generate the same output hash value used for the seed.

BRIEF SUMMARY OF THE INVENTION

The present invention comprises a system whereby random number sequences are generated based on user station geodetic datum (pos/time). Geodetic information, being temporary in nature, can be propagated in position, time or both to provide dynamically updating PRNG seeding for any participant. The guaranteed uniqueness of the geodetic datum assures a single-time worldwide unique seed generation capability thereby allowing a PRNG to create a random number sequence with similar properties. This is based on the fact two user stations cannot simultaneously occupy the same physical space at the same time. The invention is compatible with current implementations of mobile communications and equipment given the global acceptance/usage of embedded GNSS capabilities.

BRIEF DESCRIPTION OF THE DRAWINGS

FIG. 1 is a system block diagram for the preferred embodiment of the present invention.

FIG. 2 is an example application data channel encoder block diagram embodiment of the present invention.

FIG. 3 is an example application data channel decoder block diagram embodiment for the present invention.

FIG. 4 is an example application automotive ranging sensor block diagram embodiment for the present invention.

FIG. 5 is an example application synchronous encryption block diagram embodiment for the present invention.

| REFERENCE NUMERALS IN THE DRAWINGS | | | |
|---|---|---|---|
| 100 | GNSS Receiver | 102 | External Communication Interface |
| 104 | Timing Update Controller | 106 | PRN Seed Formatter |
| 108 | PRN Generator | 110 | Timing Control Information |
| 112 | Geodetic Datum | 114 | Timing Information |

-continued

REFERENCE NUMERALS IN THE DRAWINGS

| | | | |
|---|---|---|---|
| | Information | | |
| 116 | GNSS Receiver Control Information | 118 | Seed Format Information |
| 120 | PRN Seed Information | 122 | Pseudo Random Number Sequence |
| 124 | GNSS Satellite Signals | 126 | Data Communication Information |
| 200 | GNSS Receiver | 202 | External Communication Interface |
| 204 | Data Stream Information | 206 | PRBS Generator Circuit |
| 208 | Data Channel Transmit Circuit | 210 | Processor |
| 212 | Seed Format Information | 214 | Timing Control Information |
| 216 | Control Software | 218 | PRBS Data Stream Encoder |
| 220 | PBRS Encoded Data Stream | 222 | Geodetic Datum Information |
| 224 | GNSS Receiver Control Information | 226 | PRBS Seed Formatter |
| 300 | GNSS Receiver | 302 | External Communication Interface |
| 304 | Data Stream Information | 306 | PBRS Encoded Data Stream |
| 308 | Processor | 310 | PRBS Seed Formatter |
| 312 | Seed Format Information | 314 | Timing Control Information |
| 316 | PRBS Generator Circuit | 318 | Data Channel Receive Circuit |
| 320 | PRBS Data Stream Decoder | 322 | Control Software |
| 324 | GNSS Receiver Control Information | 326 | Geodetic Datum Information |
| 400 | GNSS Receiver | 402 | External Communication Interface |
| 404 | Processor | 406 | Sensor Timing Generator Circuit |
| 408 | Sensor Frequency Generator Circuit | 410 | Sensor Transmitter Circuit |
| 412 | GNSS Receiver Control Information | 414 | Control Software |
| 416 | Seed Format Information | 418 | PRN Seed Formatter (Sensor Timing) |
| 420 | Sensor Target Processing | 422 | Geodetic Datum Information |
| 424 | PRN Generator (Sensor Timing) | 426 | PRN Seed Formatter (Sensor Frequency) |
| 428 | PRN Generator (Sensor Phase) | 430 | Timing Control Information |
| 432 | PRN Generator (Sensor Frequency) | 434 | PRN Seed Formatter (Sensor Phase) |
| 436 | Sensor Phase Code Generator Circuit | 438 | Sensor Receiver Circuit |
| 440 | Sensor Received Waveforms | 442 | Sensor Control Information |
| 444 | Sensor Phase Code Information | 446 | Sensor Timing Information |
| 448 | Sensor Frequency Information | 448 | Sensor Frequency Information |
| 500 | GNSS Receiver | 502 | Processor |
| 504 | Control Software | 506 | Control Channel Interface |
| 508 | Data Link Receive Circuit | 510 | Data Link Transmit Circuit |
| 512 | GNSS Receiver Control Information | 514 | Geodetic Datum Information |
| 516 | Key Store and Generation | 518 | Block Data Decryption |
| 520 | Block Data Encryption | 522 | Received Data Stream |
| 524 | Transmitted Data Stream | | |

DETAILED DESCRIPTION OF THE INVENTION

The preferred embodiment system block diagram of the present invention is shown in FIG. 1 wherein a GNSS receiver provides geodetic datum information formatted into a PRN generator seed value. The PRN generator, based on a unique seed, will then have the capability to provide a worldwide unique random number sequence for any station. Component blocks of the preferred embodiment invention can be implemented as required within either hardware circuitry or control software depending on processing rates necessary to support the application. GNSS receiver 100 receives satellite signals 124 used to create geodetic datum information 112. Example existing satellite constellations supporting GNSS satellite signals 124 capability are GPS (US), Galileo (Europe), GLONASS (Russian) and BeiDou (China). Geodetic datum information 112 contains continuously updated position/time parameters output by GNSS receiver 100. Additionally, GNSS receiver 100 outputs timing control information 110 utilized as inputs to timing update controller 104. Example timing control signals 110 can include but are not limited to one pulse per second (1PPS) or ten pulses per second (10PPS) signals. Timing update controller 104 provides periodic updating of PRN seed formatter 106 and PRN generator 108 using timing information 114 based on timing control information 110. Example timing information 114 can include but are not limited to digital pulse(s) or clock signals to synchronize the updating or initialization of PRN seed values and PRN generator outputs. PRN seed formatter 106 takes as input Geodetic Datum information 112 and provides seed formatting operations based on seed format information 118. Examples of seed format information 118 can include but is not limited to: format selection, algorithm selection, subfield mapping, or numerical scaling. The PRN seed 120 information is input to PRN generator 108 to derive a unique random number sequence 122 as output to drive circuitry supporting the specific application. The PRN sequence 122 will be unique based on geodetic (position/time) data supplied by GNSS receiver 100. An optional external communication interface 102 can be included to allow data communication 126 with an external host. External host communications can include GNSS receiver control information 116 used for example to control or obtain status from the GNSS receiver. Additionally, seed format information 118 can be sourced by the external communication interface 102 to control or update the PRN seed information 120 format.

An example data channel encoder circuit for the preferred embodiment is presented in FIG. 2. In this example, data stream information is combined with a unique pseudo random binary sequence (PRBS) thereby synchronously encrypting or encoding the information. A receiving station would need to know the transmitting stations geodetic datum and seed format to recover the data stream information. This synchronous encryption is analogous to channel separation based on Code Division Multiple Access (CDMA) but using a non-repeating code disallowing a bad actor station to perform channel acquisition. GNSS receiver 200 provides the station's current geodetic datum information. Processor 210 executes control software 216 acting to route data and operationally control the data channel encoder circuit. External communication interface 202 operates on external communication data interfacing with processor 210. External communication data transactions can include but are not limited to data stream information, seed format information and interface control information. Control software 216 produces data stream information 204 to be transmitted by the encoded data channel. Geodetic datum information 224 is received by control software 216 and also transferred as geodetic datum information 222 to PRN seed formatter 226. Seed formatter 226 also receives seed format information 212 from the control software. PRBS generator 206 generates a continuous pseudo random binary sequence based on the seed value provided by seed formatter 226 and timing control information 214. Timing control information 214 can be used by the processor to synchronize or update the operation of PRBS generator 206. Logic element 218 creates an encoded or encrypted data stream 220 by combining the non-encoded data stream 204 with the PRBS stream. The encoded data stream 220 is transmitted onto the data link by data channel transmitter 208. Synchronous encryption requires both the sender and receiver to have prior knowledge of the encryption parameters. One example of transferring this information would be to utilize the last or trailing data stream values of the current iteration to contain the next iteration encryption parameters. Alternatively, iteration to iteration encryption parameters could be transferred over the external communication interface.

In companion with FIG. 2, an example channel decoder circuit based on the preferred embodiment is presented in FIG. 3. In this example, data stream information is extracted by removing the unique pseudo random number sequence from an encoded stream thereby synchronously decrypting or decoding the information. GNSS receiver 300 provides the station's current geodetic datum information. Control software 322 executes on processor 308 acting to route data and operationally control the data channel decoder circuit. External communication interface 302 operates on external communication data interfacing with processor 308. External communication data transactions can include but are not limited to data stream information, seed format information and interface control information. Control software 322 receives decoded data stream information 304 as received by the encoded data channel. Geodetic datum information 324 is received by control software 308 and also transferred as geodetic datum information 326 to PRN seed formatter 310. Seed formatter 310 also receives seed format information 312 from the control software. PRBS generator 316 generates a continuous pseudo random bit sequence based on the seed value provided by seed formatter 310 and timing control information 314. Timing control information 314 can be used by the processor to synchronize or initialize the operation of PRBS generator 316. Logic element 320 extracts data stream 304 from the received data link encoded data stream 306 using the PRBS. The encoded data stream 306 is received from the data link by data channel receiver transmitter 318.

Another exemplary application of the present invention would consist of a mobile vehicle platform ranging sensor system to detect the presence of nearby vehicles or obstacles for collision avoidance and emergency braking control. Common ranging sensor types found on mobile vehicle platforms applicable to this example include but are not limited to radar, lidar, and ultrasonic ranging. These sensor type terminologies can be used interchangeably with the term "sensor" in the following example description. In this example, the GNSS derived random sequence would control sensor operating parameters such as transmitted timing, transmitted frequency and waveform phase-code (chirp) modulation. Randomized control of these parameters is desired to minimize or eliminate sensor interference between multiple competing users located within a close proximity usage environment. One example of multiple users within close proximity would be a busy four-way traffic intersection with multiple vehicles entering/exiting on each side. In this situation, there could possibly be 30-40 vehicles within a 600 ft×600 ft area for a busy urban area. Randomization of each vehicle's sensor operating parameters serves to uniquely define their signature or emissions profile allowing independent uncorrelated operation. With reference to FIG. 4, timing generator 406 controls the time of a sensor transmission or sequence of transmissions occur whereby users having different timing would appear decorrelated. Frequency generator 408 controls the carrier frequency of transmission or spectral content of emission whereby again users having different frequencies appear decorrelated. Finally, phase code generator 436 controls the phase step progression or chirp modulating a transmission is usable to decorrelate sensor users. Each of these sensor parameters being fully independent, allow each or all of them being available for randomization to control sensor operation as shown in FIG. 4. GNSS receiver 400 provides the station's current geodetic datum information 422 to seed formatters 418, 426, 434 and also to processor 404 as part of the GNSS receiver control information 412. Control software 414 executing on processor 404 acts to operationally control the sensor functions of timing generator 406, frequency generator 408 and phase code generator 436. External communication interface 402 operates on external communication data interfacing with processor 404. External communication data transactions can include but are not limited to seed format information and external control information. Seed formatters 418, 426, 434 receive seed format information 416 from the control software 414. PRN generators 424, 432, 428 generate a random number based on the seed value provided by seed formatters 418, 426, 434 and timing control information 430 produced by processor 404. Timing control information 430 can be used to synchronize or update the operation of PRN generators 424, 432, 428. Timing generator 406 produces sensor timing information 446 based on sensor control information 442 from control software 414 and the random number from PRN generator 424. Sensor timing information 446 is transferred to transmitter 410 and receiver 438 controlling the transmission and reception of sensor waveform emissions. Frequency generator 408 produces sensor frequency 448 information based on sensor control information 442 from control software 414 and the random number from PRN generator 432. Sensor frequency information 448 is transferred to transmitter 410 and receiver 438 controlling the transmission and reception of sensor waveform emissions. Phase code generator 406 produces sensor phase code or chirp information 444 based on sensor control information 442 from control software 414 and the random number from PRN generator 428. Sensor phase code or chirp information 444 is transferred to transmitter 410 and receiver 438 controlling the transmission and reception of sensor waveform emissions. Sensor waveforms are emitted by transmitter 410 as controlled by one or more of the sensor timing information 446, sensor frequency information 448 and sensor phase code information 444. Sensor detected waveforms received by receiver 438 are transferred to target processing 420 as sensor received waveforms 440. Target processing 420 works to correlate the intentionally randomized sensor operating parameters thereby removing the effects allowing normal target detection. In this manner, sensor transmission waveforms received other nearby competing sensors remain uncorrelated as operated upon by target processing 420 thereby appearing as noise.

One further exemplary application of the present invention is synchronous block encryption of data stream packets. In this example, the network data transactions are handled by the network protocol and individual data packets are synchronously encrypted/decrypted using the present invention. GNSS receiver 500 provides the station's current geodetic datum information to control software 504. Control software 504 executing on processor 502 acts to route data streams, packet encrypt/decrypt, key generation and interface with a control channel interface. External communication interface 506 operates on external control stream information interfacing with processor 502. External communication control stream transactions can include but are not limited to seed format information and interface control information. Interface control information can include communications with other network stations to transfer or exchange cryptographic information thereby enabling encrypted data link communications. Control software 504 receives a ciphertext RX data stream 522 from a network data channel through data link receiver 508. The ciphertext RX data stream 522 is decrypted by block data decrypt function 518 into plaintext. Conversely, control software 504 takes plaintext data to be transmitted and converts it to ciphertext by block data encrypt function 520. Ciphertext TX data stream 524 is then transmitted onto a network data channel through data link transmitter 510. Encryption keys used by block data decrypt function 518 and block data encrypt function 520 are created or received by key store/generator 516. Encryption key generation is based on geodetic datum information 514 received by key store/generator 516 from GNSS receiver 500. Key store/generator 516 can be based on a PRNG function producing for new local key information and also include a storage area for remote network station key information as a library. Local encryption keys can be made available for transfer over control channel interface 506 to remote network stations supporting received data decryption. Further, decryption keys can also be received from remote network stations by control channel interface 506 supporting remotely received data decryption.

The claimed invention is:

1. A system comprising:

a. a global navigation satellite system (GNSS) receiver configured to generate timing control information and geodetic datum information;

b. a timing update controller coupled to the global navigation satellite system (GNSS) receiver, the timing update controller generating timing information in response to the timing control information;

c. a pseudo random number seed formatter coupled to the timing update controller and the global navigation satellite system (GNSS) receiver, the pseudo random number seed formatter producing a fixed length pseudo random number seed value by hashing algorithm in response to the timing information and the geodetic datum information;

d. a pseudo random number generator coupled to the timing update controller and the pseudo random number seed formatter, the pseudo random number generator producing a pseudo random number sequence by linear feedback polynomial circuit in response to the timing information and the pseudo random number seed value;

e. wherein the pseudo random number seed formatter is configured to receive seed format information via an external communication interface and control the pseudo random number seed value format; and f. wherein the timing update controller is configured to generate timing information to synchronize updating or initialization of pseudo random seed values.

2. The system of claim 1, wherein the pseudo random number generator is further configured to output a pseudo random binary sequence used to encrypt or decrypt a data stream.

3. The system of claim 1, wherein the pseudo random number generator is further configured to produce encryption key information used to encrypt or decrypt a data packet.

4. A method comprising:

a. generating timing control information and geodetic datum information by a global navigation satellite system (GNSS) receiver;

b. generating timing information by a timing update controller to synchronize updating or initialization of pseudo random seed values in response to the timing control information;

c. producing fixed length pseudo random number seed values by a hashing algorithm based pseudo random number seed formatter in response to the geodetic datum information and the timing information;

d. controlling the format of pseudo random number seed values by the pseudo random number seed formatter in response to seed format information received via an external communication interface; and e. producing a pseudo random number sequence by a linear feedback polynomial circuit based pseudo random number generator in response to the timing information and the pseudo random number seed value.

5. The method of claim 4, further comprising generating a pseudo random binary sequence by the pseudo random number generator used to encrypt or decrypt a data stream.

6. The method of claim 4, further comprising generating encryption key information by a pseudo random number generator used to encrypt or decrypt a data packet.

7. A system comprising:

a. a global navigation satellite system (GNSS) receiver configured to generate timing control information and geodetic datum information;

b. a processor executing control software configured to generate sensor control information, seed format information and timing control information;

c. a first pseudo random number seed formatter coupled to the processor and the global navigation satellite system (GNSS) receiver, the first pseudo random number seed formatter producing a first fixed length pseudo random number seed value by hashing algorithm in response to the seed format information and the geodetic datum information;

d. a first pseudo random number generator coupled to the processor and the first pseudo random number seed formatter, the first pseudo random number generator producing a first pseudo random number sequence by linear feedback polynomial circuit in response to the first pseudo random number seed value and the timing control information;

e. a sensor timing generator coupled to the processor and the first pseudo random number generator, the sensor timing generator generating sensor timing information in response to the first pseudo random number sequence information and the sensor control information;

f. a sensor transmitter circuit coupled to the sensor timing generator, the sensor transmitter circuit generating sensor emitted waveforms in response to the sensor timing information;

g. a sensor receiver circuit coupled to the sensor timing generator, the sensor receiver circuit generating sensor received waveforms in response to the sensor timing information; and h. wherein the processor is configured to generate timing control information to synchronize updating or initialization of pseudo random seed values.

8. The system of claim 7 further comprising:

a. a second pseudo random number seed formatter coupled to the processor and the global navigation satellite system (GNSS) receiver, the second fixed length pseudo random number seed formatter producing a second pseudo random number seed value by hashing algorithm in response to the seed format information and the geodetic datum information;

b. a second pseudo random number generator coupled to the processor and the second pseudo random number seed formatter, the second pseudo random number generator producing a second PRN pseudo random number sequence by linear feedback polynomial circuit in response to the second pseudo random number seed value and the timing control information; and c. a sensor frequency generator coupled to the processor and the second pseudo random number generator, the sensor frequency generator generating sensor frequency information in response to the second pseudo random number sequence information and the sensor control information;

d. wherein the sensor transmitter circuit is coupled to the sensor frequency generator, the sensor transmitter circuit generating sensor emitted waveforms in response to the sensor frequency information; and e. wherein the sensor receiver circuit is coupled to the sensor frequency generator, the sensor receiver circuit generating sensor received waveforms in response to the sensor frequency information.

9. The system of claim 7 further comprising:

a. a third pseudo random number seed formatter coupled to the processor and the global navigation satellite system (GNSS) receiver, the third pseudo random number seed formatter producing a third fixed length pseudo random number seed value by hashing algorithm in response to the seed format information and the geodetic datum information;

b. a third pseudo random number generator coupled to the processor and the third pseudo random number seed formatter, the third pseudo random number generator producing a third pseudo random number sequence by linear feedback polynomial circuit in response to the third pseudo random number seed value and the timing control information;

c. a sensor phase code generator coupled to the processor and the third pseudo random number generator, the sensor phase code generator generating sensor phase code information in response to the third pseudo random number sequence information and the sensor control information;

d. wherein the sensor transmitter circuit is coupled to the sensor phase code generator, the sensor transmitter circuit generating sensor emitted waveforms in response to the sensor phase code information; and e. wherein the sensor receiver circuit is coupled to the sensor phase code generator, the sensor receiver circuit generating sensor received waveforms in response to the sensor phase code information.

* * * * *